US009337890B2

(12) United States Patent
Mehta et al.

(10) Patent No.: US 9,337,890 B2
(45) Date of Patent: *May 10, 2016

(54) ANTENNA SELECTION WITH FREQUENCY-HOPPED SOUNDING REFERENCE SIGNALS

(71) Applicant: Mitsubishi Electric Research Laboratories, Inc., Cambridge, MA (US)

(72) Inventors: Neelesh Mehta, Quincy, MA (US); Koon Hoo Teo, Lexington, MA (US); Jinyun Zhang, Cambridge, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 162 days.

This patent is subject to a terminal disclaimer.

(21) Appl. No.: 14/104,124

(22) Filed: Dec. 12, 2013

(65) Prior Publication Data

US 2014/0098837 A1    Apr. 10, 2014

Related U.S. Application Data

(63) Continuation of application No. 12/415,578, filed on Mar. 31, 2009, now Pat. No. 9,025,471.

(51) Int. Cl.
*H04B 1/00* (2006.01)
*H04B 1/713* (2011.01)
*H04B 7/06* (2006.01)
*H04B 1/38* (2015.01)

(52) U.S. Cl.
CPC .............. *H04B 1/713* (2013.01); *H04B 1/38* (2013.01); *H04B 7/061* (2013.01)

(58) Field of Classification Search
USPC ......... 370/203, 204, 229, 230, 241, 249, 250, 370/254, 255, 339
See application file for complete search history.

(56) References Cited

U.S. PATENT DOCUMENTS

| 8,238,405 | B2* | 8/2012 | Mehta et al. | 375/133 |
| 2009/0042616 | A1* | 2/2009 | Teo et al. | 455/562.1 |
| 2012/0120826 | A1* | 5/2012 | Hao et al. | 370/252 |
| 2015/0016489 | A1* | 1/2015 | Mehta et al. | 375/135 |

* cited by examiner

*Primary Examiner* — Yemane Mesfin
*Assistant Examiner* — Mon Cheri Davenport
(74) *Attorney, Agent, or Firm* — Gennadiy Vinokur; James McAleenan; Hironori Tsukamoto

(57) ABSTRACT

A transceiver has a first antenna and a second antenna for transmitting alternatively a frequency-hopped sounding reference signal (SRS) over a sub-band of a bandwidth at a time. The transceiver includes a determination unit for determining whether a number of sub-bands in the bandwidth is odd or even, a transmitter for transmitting the SRS continuously from the first antenna, if the number of sub-bands is even, and a receiver for receiving a response to the transmitting.

1 Claim, 9 Drawing Sheets

200

300

700

ANTENNA SELECTION WITH FREQUENCY-HOPPED SOUNDING REFERENCE SIGNALS

RELATED APPLICATIONS

This application is a continuation of U.S. patent application Ser. No. 12/415,578 submitted by Mehta et al. on Mar. 31, 2009 for "Antenna Selection with Frequency-Hopped Sounding Reference Signals."

FIELD OF THE INVENTION

This invention relates generally to antenna selection in wireless communication, networks, and more particularly to selecting antennas with frequency-hopped sounding reference signals.

BACKGROUND OF THE INVENTION

OFDMA and SC-OFDMA

In a wireless communication network, such as the $3^{rd}$ generation (3G) wireless cellular communication standard and the 3GPP long term evolution (LTE) standard, it is desired to concurrently support multiple services and multiple data rates for multiple users in a fixed bandwidth channel. One scheme adaptively modulates and codes symbols before transmission based on current channel estimates. Another option available in LTE, which uses orthogonal frequency division multiplexed access (OFDMA), is to exploit multi-user frequency diversity by assigning different sub-carriers or groups of sub-carriers to different users or UEs (user equipment, mobile station or transceiver), in the single carrier frequency division multiple access (SC-FDMA) uplink of LTE, in each user, the symbols are first together spread by means of a Discrete Fourier Transform (DFT) matrix and are then assigned to different sub-carriers. The network bandwidth can vary, for example, from 1.25 MHz to 20 MHz. The network bandwidth is partitioned into a number of subcarriers, e.g., 1.024 subcarriers for a 10 MHz bandwidth.

The following standardization documents are applicable 36.211, 3rd Generation Partnership Project; Technical Specification Group Radio Access Network; Physical Channels and Modulation (Release 8), v 1.0.0 (2007-03); R1-01057, "Adaptive antenna switching for radio resource allocation in the EUTRA uplink," Mitsubishi Electric/Nortel/NTT DoCoMo, 3GPP RAN1#48, St. Louis, USA; R1-071119, "A new DM-RS transmission scheme for antenna selection in E-UTRA uplink," LGE, 3GPP RAN1#48, St. Louis, USA; and "Comparison of closed-loop antenna selection with open-loop transmit diversity (antenna switching within a transmit time interval (TTI)," Mitsubishi Electric, 3GPP RAN1#47bis, Sorrento, Italy. According to the 3GPP standard, the base station (BS) is enhanced, and is called the "Evolved NodeB" (eNodeB). We use the terms BS and eNodeB interchangeably.

Multiple Input Multiple Output (MIMO)

In order to further increase the capacity of a wireless communication network in fading channel environments, multiple-input-multiple-output (MIMO) antenna technology can be used to increase the capacity of the network without an increase in bandwidth. Because the channels for different antennas can be quite different, MIMO increases robustness to lading and also enables multiple data streams to be transmitted concurrently.

Moreover, processing the signals received in spatial multiplexing schemes or with space-time trellis codes requires transceivers where the complexity can increase exponentially as a function of the number of antenna.

Antenna Selection

Antennas are relatively simple and cheap, while RF chains are considerably more complex and expensive. Antenna selection reduces some of the complexity drawbacks associated with MIMO networks. Antenna selection reduces the hardware complexity of transmitters and receivers in the transceivers by using fewer RF chains than the number of antennas.

In antenna selection, a subset of the set of available antennas is adaptively selected by a switch, and only signals for the selected subset of antennas are connected to the available RF chains for signal processing, which can be either transmitting or receiving. As used herein, the selected subset, in all cases, means one or more of all the available antennas in the set of antennas.

Antenna Selection Signals

Pilot Tones or Reference Signals

In order to select the optimal subset of antennas, channels corresponding to available subsets of antennas need to be estimated, even though only a selected optimal subset of the antennas is eventually used for transmission.

This can be achieved by transmitting antenna selection signals, e.g., pilot tones, also called reference signals, from different antennas or antenna subsets. The different antenna subsets can transmit either the same pilot tones or use different ones. Let $N_t$ denote the number of transmit antennas, $N_r$ the number of receive antennas, and let $R_t=N_t/L_t$ and $R_r=N_r/L_r$ be integers. Then, the available transmit (receive) antenna elements can be partitioned into $R_t$ ($R_r$) disjoint subsets. The pilot repetition approach repeats, for $R_t \times R_r$ times, a training sequence that is suitable for an $L_t \times L_r$ MIMO network. During each repetition of the training sequence, the transmit RF chains are connected to different subsets of antennas. Thus, at the end of the $R_t \times R_r$ repetitions, the receiver has a complete estimate of all the channels from the various transmit antennas to the various receive antennas.

In case of transmit antenna selection in frequency division duplex (FDD) networks, in which the forward and reverse links (channels) are not identical, the transceiver feeds back the optima set of the selected subset of antennas to the transmitter. In reciprocal time division duplex (TDD) networks, the transmitter can perform the selection independently.

For indoor local area network (LAN) applications with slowly varying channels, antenna selection can be performed using a media access (MAC) layer protocol, see IEEE 802.11n wireless LAM draft specification, 1. P802.11n/D1.0, "Draft amendment to Wireless LAN media access control (MAC) and physical layer (PHY) specifications: Enhancements for higher throughput," Tech. Rep., March 2006.

Instead of extending the physical (PHY) layer preamble to include the extra training fields (repetitions) for the additional antennas, antenna selection training is done at the MAC layer by issuing commands to the physical layer to transmit and receive packets by different antenna subsets. The training information, which is a single standard training sequence for an $L_t \times L_r$ MIMO network, is embedded in the MAC header field.

SC-FDMA Structure in LTE

The basic uplink transmission scheme is described in 3GPP TR 25.814, v1.2.2 "Physical Layer Aspects for Evolved UTRA." The scheme is a single-carrier transmission (SC-FDMA) with cyclic prefix (CP) to achieve uplink inter-user orthogonality and to enable efficient frequency-domain equalization at the receiver.

Broadband Sounding Reference Signals (SRS)

The broadband SRS helps the eNodeB to estimate the entire frequency domain response of the uplink channel from the user to the eNodeB. This helps frequency-domain scheduling, in which a subcarrier is assigned, in principle, to the user with the best uplink channel gain for that, subcarrier. Therefore, the broadband SRS can occupy the entire network bandwidth, e.g., 5 MHz or 10 MHz, or a portion thereof as determined by the eNodeB. In the latter case, the broadband SRS is frequency hopped over multiple transmissions in order to cover the entire network bandwidth.

SUMMARY OF THE INVENTION

The embodiments of the invention describe a method for antenna selection in a wireless communication network. The network includes a transceiver having a set of antennas. The transceiver is configured to transmit a frequency-hopped sounding reference signal (SRS) over a subband from a subset of antennas at a time. The transceiver transmits the frequency-hopped SRS from subsets of antennas in the set of antennas alternately. In response to the transmitting, the transceiver receives information indicative of an optimal subset of antennas and transmits data from the optimal subset of antennas.

In some embodiments, we assign an index for each subset of antennas. We also use the 'selected' and 'unselected' subset of antennas as an indication to select particular subset of the antennas by the transceiver for the transmission. The index of the selected subset of antennas $a(n_{SRS})$ depends on the sub-frame number $N_{SRS}$ in which the SRS is transmitted and a number of the subset of antennas. Therefore, the index pattern above can be specified in the form a functional relationship between $a(N_{SRS})$ and $n_{SRS}$.

In one embodiment, the transceiver has two subsets of antennas, and the indexes are 0 and 1. Accordingly, the transmitting alternately leads to an index pattern of the selected subset of antennas [0, 1, 0, 1, 0, 1, 0, 1 . . . ]. In another embodiment, the transceiver has three subsets of antennas, the index pattern of the selected subset of antennas [0, 1, 2, 0, 1, 2, 0, 1, 2, 0, 1, 2 . . . ]. In various embodiments, we are switching the index of the selected subset of antennas every time after the transmitting the frequency-hopped SRS.

Accordingly, one embodiment of the invention discloses a transceiver having a first antenna and a second antenna for transmitting alternatively a frequency-hopped sounding reference signal (SRS) over a sub-band of a bandwidth at a time. The transceiver includes a determination unit for determining whether a number of sub-bands in the bandwidth is odd or even; a transmitter for transmitting the SRS continuously from the first antenna, if the number of sub-bands is even; and a receiver for receiving a response to the transmitting.

Another embodiment discloses a method for antenna selection (AS) in a transceiver having a number of subsets of antennas for transmitting a frequency-hopped sounding reference signal (SRS) over a sub-band of a bandwidth from a subset of antennas at a time. The method includes a determining whether a number of sub-bands in the bandwidth is an integer multiplier of the number of subsets of antennas; and transmitting the SRS alternately from the subsets of the antennas if the number of sub-bands is not the integer multiplier of the subsets of antennas, and for transmitting the SRS substantially alternatively, if the number of sub-bands is tire integer multiplier of the subsets of antennas, wherein the transmitting substantially alternatively includes transmitting the SRS continuously from the same subset of antennas.

Yet another embodiment discloses a transceiver having a first antenna and a second antenna for transmitting alternatively a frequency-hopped sounding reference signal (SRS) over a sub-band of a bandwidth at a time. The transceiver includes a processor for determining whether a number of sub-bands in the bandwidth is odd or even, for switching an index of a subset of antennas transmitting die SRS every time after the transmitting, and, if the number of sub-bands is even, for periodically altering the index to include a continuous SRS transmission from the same subset of antennas.

DETAILED DESCRIPTION OF THE PREFERRED EMBODIMENTS

LTE Network Overview

Figure 1:
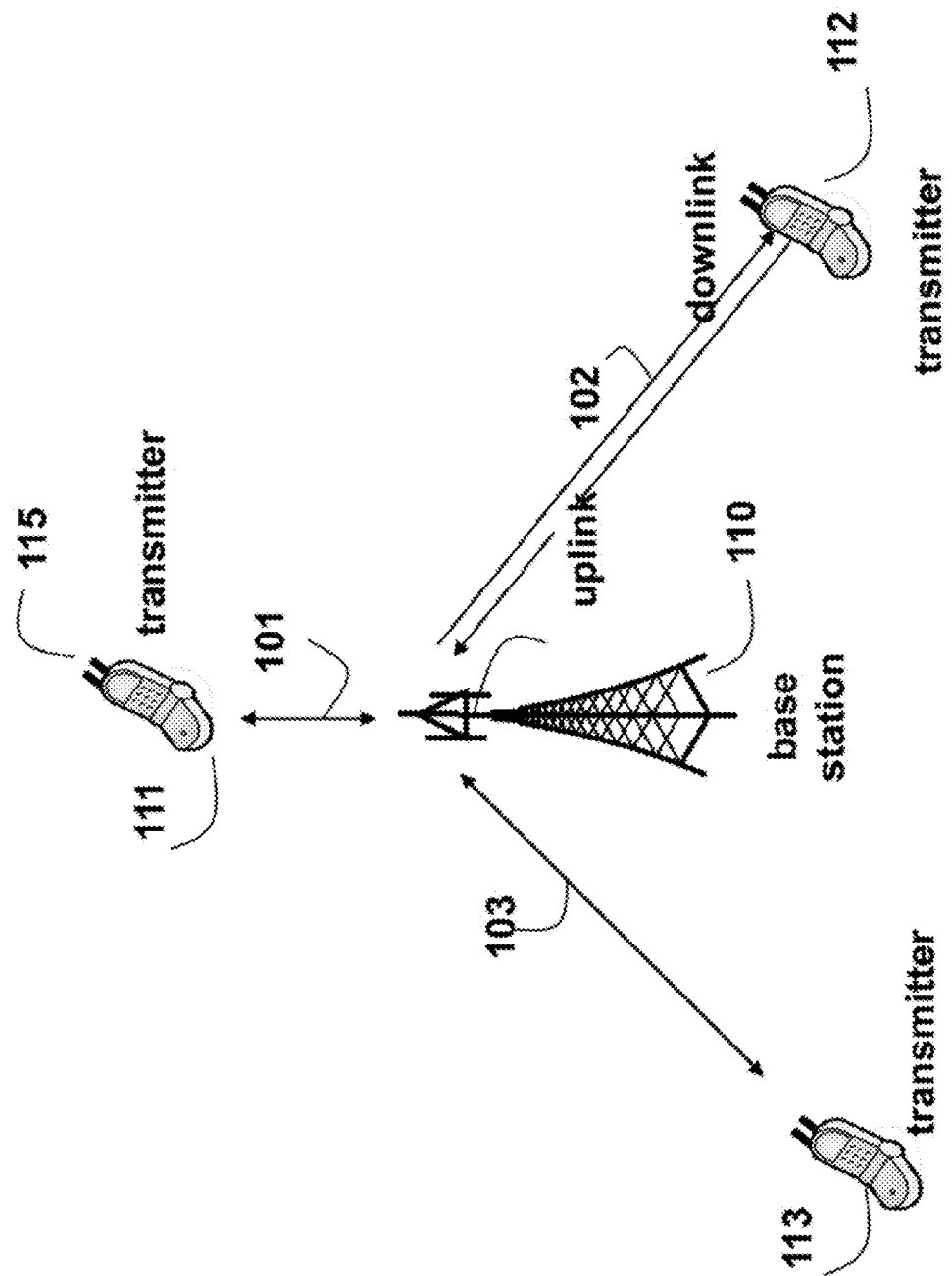
FIG. 1 is a block diagram of a wireless network according to an embodiment of the invention.

FIG. 1 shows the general structure of an LTE wireless network according to an embodiment of the invention. Multiple user equipments (UEs) or mobile transceivers 111-113 communicate with a stationary base station (BS) 110. The base station also includes transceivers.

The base station is called an evolved Node B (eNodeB) in the LTE standard. The eNodeB 110 manages and coordinates all communications with the transceivers in a cell using wireless channels or connections 101, 102, 103. Each connection can operate as a downlink (DL) from the base station to the transceiver or an uplink from the transceiver to the base station. Because the transmission power available at the base station is orders of magnitude greater than the transmission power at the transmitter, the performance on the uplink is much more critical.

To perform wireless communication, both the eNodeB and the transmitters are equipped with at least one RF chain and a number of antennas. Normally, the number of antennas and the number RF chains are equal at the eNodeB. The number of antennas at the base station can be quite large, e.g., eight. However, due to the limitation on cost, size, and power consumption, mobile transceivers usually have less RF chains than antennas 115. The number of antennas available at the transceiver is relatively small, e.g., two or four, when compared with the base station. Therefore, antenna training and selection as described is applied at the transceivers.

During operation, the transceiver switches the antennas between transmit RF chain(s) to transmit. Generally, antennas selection selects a subset of antennas from a set of available antennas at the transceiver. The antennas selection includes the training, which is used for generating and transmitting and receiving antenna selection signals. The embodiments of the invention enable the network to accommodate transceivers with different SRS bandwidths in an orthogonal manner, and use the limited resource of SRS sequences well.

LTE Frame Structure

The uplink (transceiver to eNodeB) and downlink (eNodeB to transceiver) transmissions are organized into radio frames. A radio frame is 10 ms long, and consists of 20 slots 306 of duration 0.5 ms each. Two consecutive slots constitute a subframe 301. The frame includes twenty subframes in the time domain.

Figure 2:
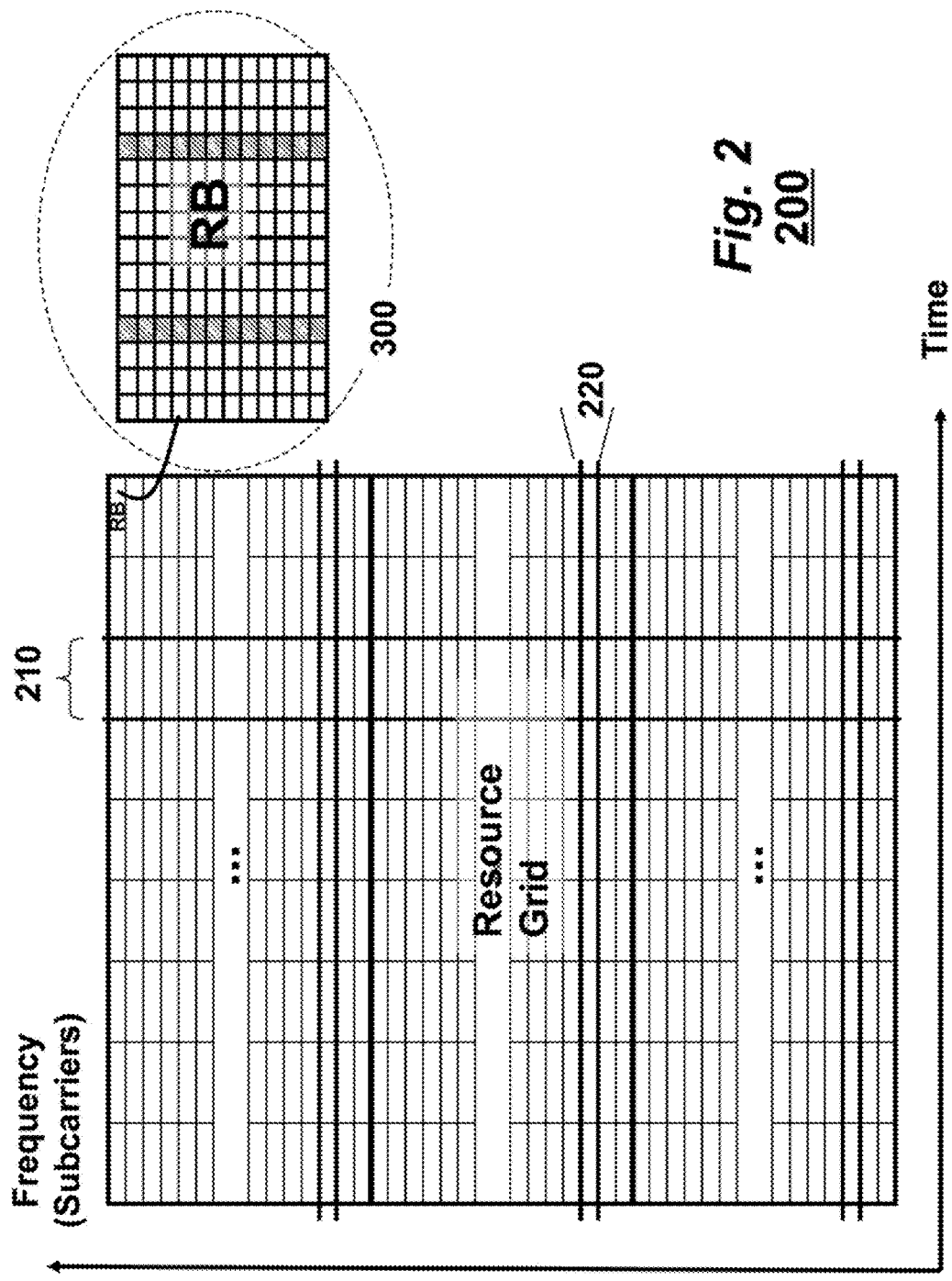
FIG. 2 is a block diagram of an uplink resource grid according to an embodiment of the invention.

FIG. 2 shows the baste structure of a SC-FDMA (single carrier frequency division multiple access) uplink resource grid 200. The horizontal axis indicates time or SC-FDMA symbols and the vertical axis indicates frequency or subcarriers. The number of subcarriers depends on the network bandwidth, which can range from 1.25 MHz to 20 MHz for example.

The uplink resource grid consists of resource elements. Each resource element is indemnified by the subcarrier and the SC-FDMA symbol. The resource elements are grouped into resource blocks. A resource block (RB) consists of 12 consecutive subcarriers and six or seven consecutive SC-FDMA symbols in time. The number of SC-FDMA symbols depends on the cyclic prefix (CP) length. For a normal cyclic prefix, the number of SC-FDMA symbols equals 7 and for an extended cyclic prefix, the number of SC-FDMA symbols equals 6.)

Figure 3:
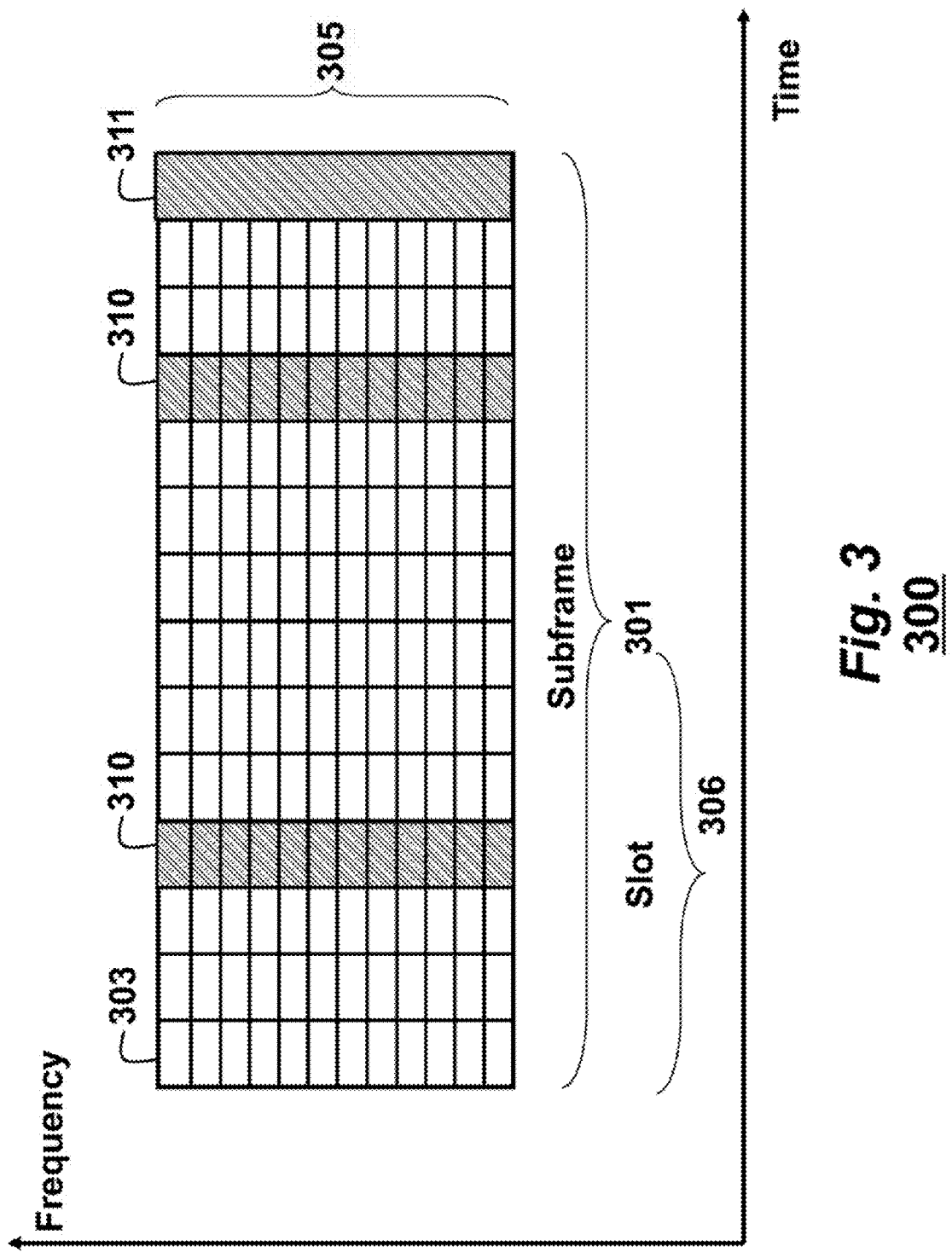
FIG. 3 is a block diagram of a resource block according to an embodiment of the invention.

Each subframe constitutes a resource block, see inset 300 and FIG. 3 for details. For the purpose of this specification and appended claims, we use the terms the subframe and the transmission time interval (TTI) interchangeably.

FIG. 3 shows a structure of a resource block (RB) 300 for the normal cyclic prefix. The vertical axis indicates frequency, and the horizontal axis time. In frequency domain, the resource block includes of a number of subcarriers. In time domain, the RB is partitioned into SC-FDMA symbols, which may include data 203 and reference signals (RS) 210. Two types of the RS are used in the uplink: sounding reference signals (SRS) 311 and demodulation reference signals (DMRS) 310.

Both the SRS and the DMRS are generated using a constant amplitude zero autocorrelation sequence (CAZAC) sequence such as a Zadoff-Chu sequence, as explained in Section 5.5.1 of TS 36.211 v8.5.0 incorporated herein by reference. When the sequence length is not equal to the length possible for a Zadoff-Chu sequence, the sequence of desired length is generated by extending circularly a Zadoff-Chu sequence of length close to and less than the desired length or by truncating a Zadoff-Chu sequence of length close to and greater than the desired length. The DMRS is transmitted in the fourth SC-FDMA symbol for normal cyclic prefix and in the third SC-FDMA symbol for the extended cyclic prefix. The SRS, when transmitted, is typically transmitted in the last SC-FDMA symbol of the subframe except for special subframes as described in TS 36.211 v.8.5.0. However, the embodiments of the invention do not depend on the SC-FDMA symbol in which the RS is transmitted.

Antennas Selection

Typically, the RS is transmitted along with or separately from user data from different subsets of antennas. Based on the RSs, the base station, estimates channels and identifies the optimal subset, of antennas for data transmission.

Figure 4:
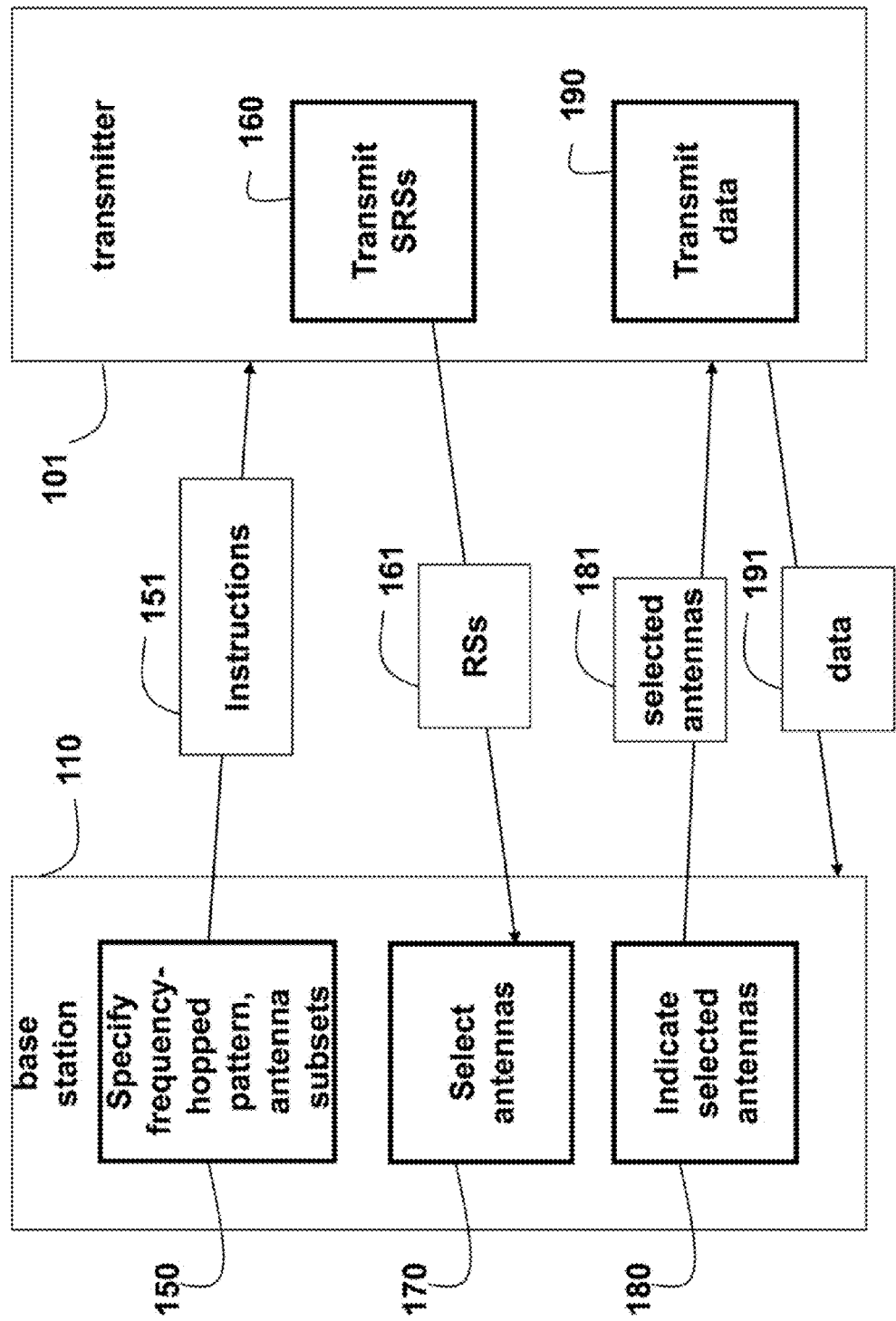
FIG. 4 is a block diagram of method for selecting antennas according to an embodiment of the invention.

FIG. 4 shows the basic method for antenna selection according to an embodiment of the invention. The base station 110 specifies instructions 151, e.g., frequency-hopped pattern and subsets of antennas to use for transmitting RSs 161. The transceiver 101 transmits the RSs 161 according to the instructions 151.

The base station selects 170 a subset of antennas 181 based on the received RSs. Then, the base station indicates 180 the selected subset of antenna 181 to the transceiver. Subsequently, the transceiver 101 transmits 190 data 191 using the selected subset of antennas 181. The transceiver can also use the same subset of antennas for receiving transmitting data.

Sounding Reference Signal (SRS)

The SRS is usually a wideband or variable bandwidth signal. The SRS enables the base station to estimate the frequency response of the entire bandwidth available for the network, or only a portion thereof. This information enables the base station to perform resource allocation such as uplink frequency-domain scheduling. According to the embodiment of the invention, the SRSs are also used for antenna selection.

Another option for LTE is to use the frequency-hopping (FH) pattern to transmit the SRS. Specifically, a hopping SRS, with a bandwidth smaller than the network bandwidth, i.e., a subband, is transmitted based on a pre-determined frequency hopping pattern. The hopped SRSs, over multiple transmissions, span a large portion of the entire bandwidth available for the network, or even the entire available bandwidth. With frequency hopping, the probability that transceivers interfere with each other during training is decreased.

Figure 5:
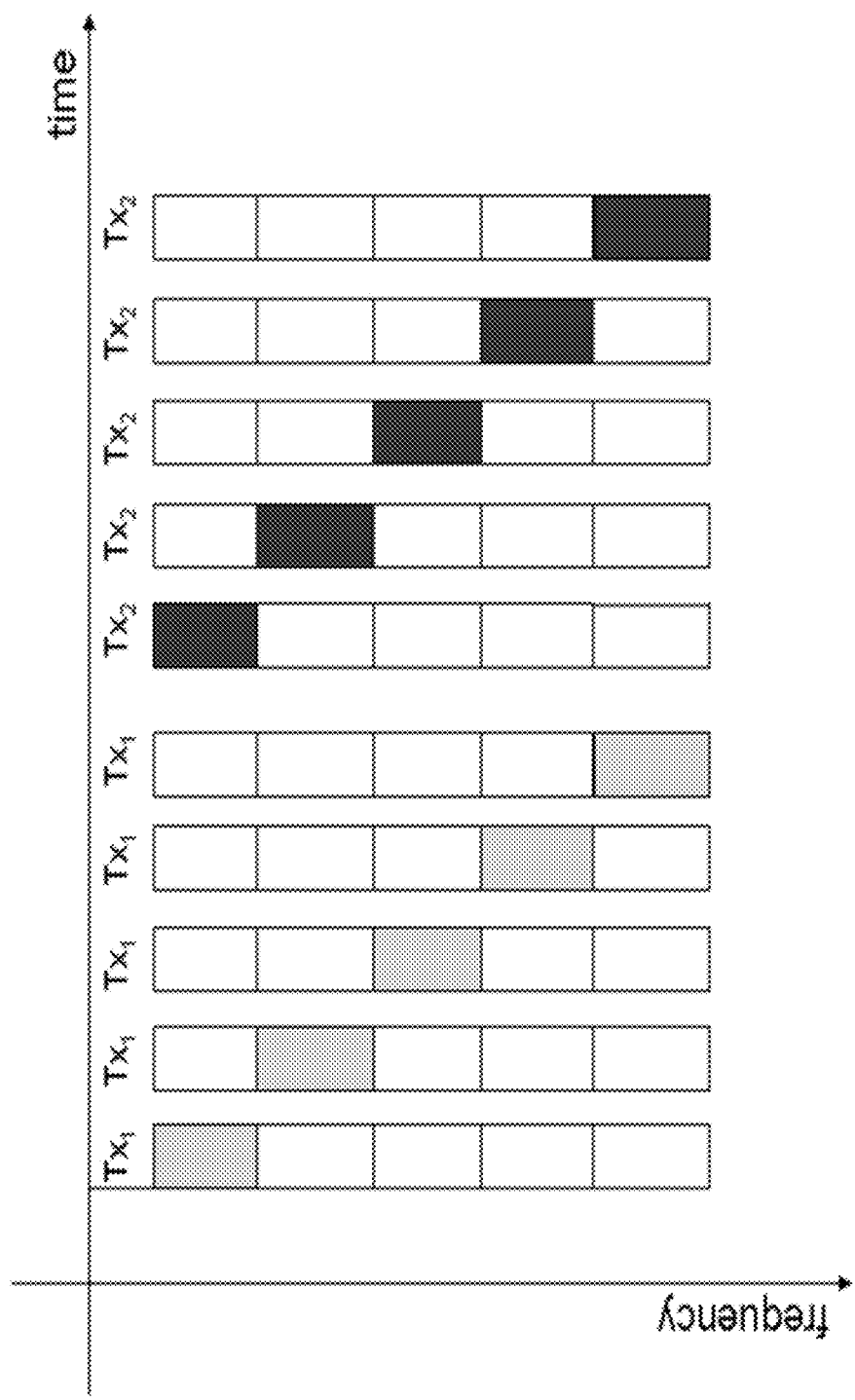
FIGS. 5 and 6 are block diagrams of a frequency-hopped sounding reference signal (SRS) transmission.

However, if performed incorrectly, antenna selection with a frequency-hopped variable bandwidth SRS results in limited, performance improvement, particularly if the transceiver is moving rapidly. For example, as shown on FIG. 5, all the subbands of antenna $Tx_1$ are successively sounded by a frequency-hopped SRS. Thereafter, the subbands of antenna $Tx_2$ are successively sounded in a similar manner, as shown by the shaded blocks. However, the channel estimates obtained from this frequency-domain antenna selection training pattern rapidly becomes outdated.

Figure 6:
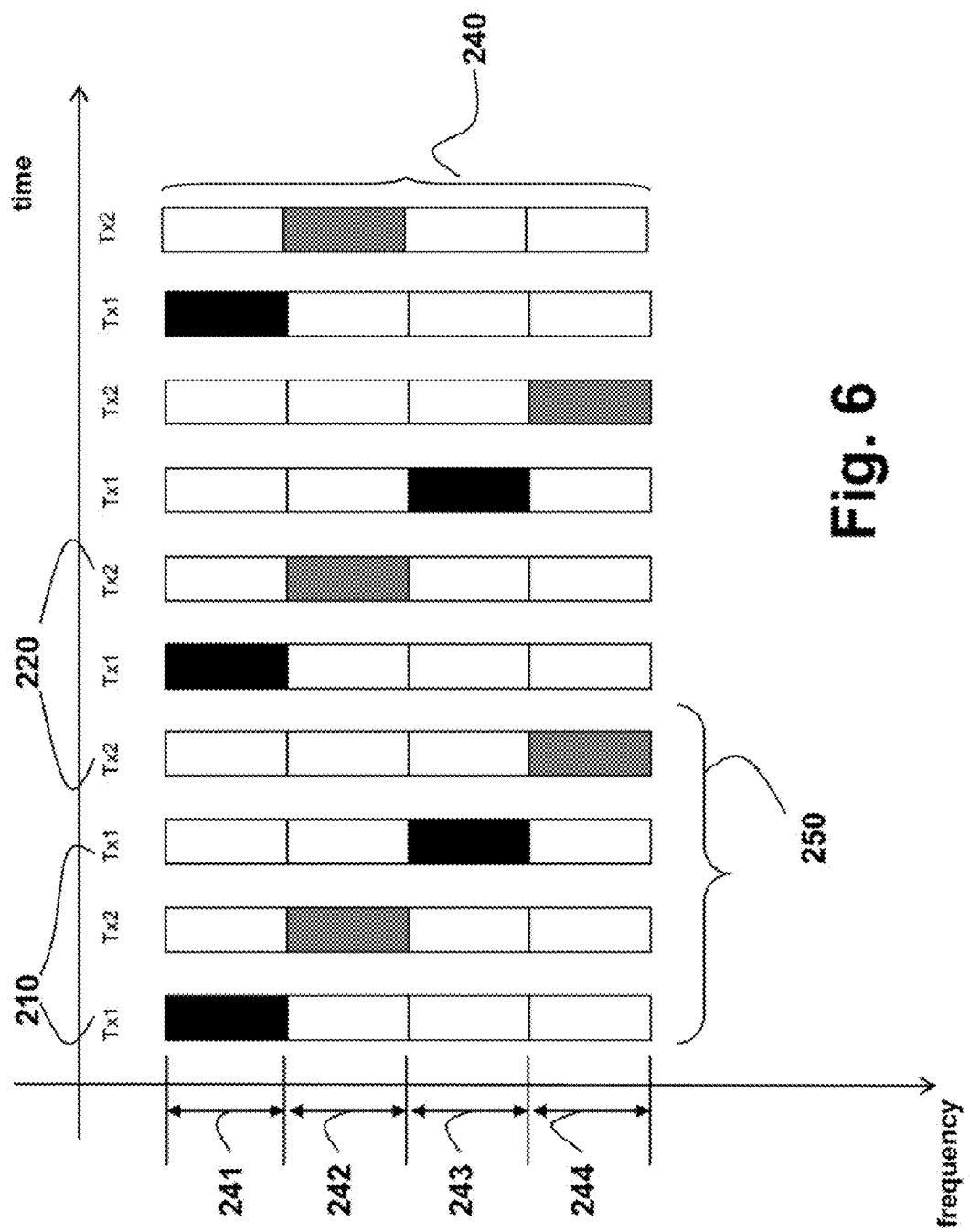

FIG. 6 shows subframes with frequency-hopped SRS transmitted from available subsets of antennas alternately. For example, the transceiver transmits the SRS alternately from two subsets of antennas, i.e., Tx1 210 and Tx2 220. The available bandwidth 240 is partitioned into four subbands 241-244, such that the SRS covers the bandwidth with four transmissions 250. Please note, that a subband can occupy one or multiple RB.

As can be seen from FIG. 6, in this transmission scenario, the SRSs for the subbands 241 and 243 are always transmitted from the subset of antennas Tx1, and the SRSs for the subbands 242 and 244 are always transmitted from the subset of antennas Tx2. Hence, the transceiver is not able to estimate the channel over entire frequency domain for each available subset of antennas.

Figure 7:
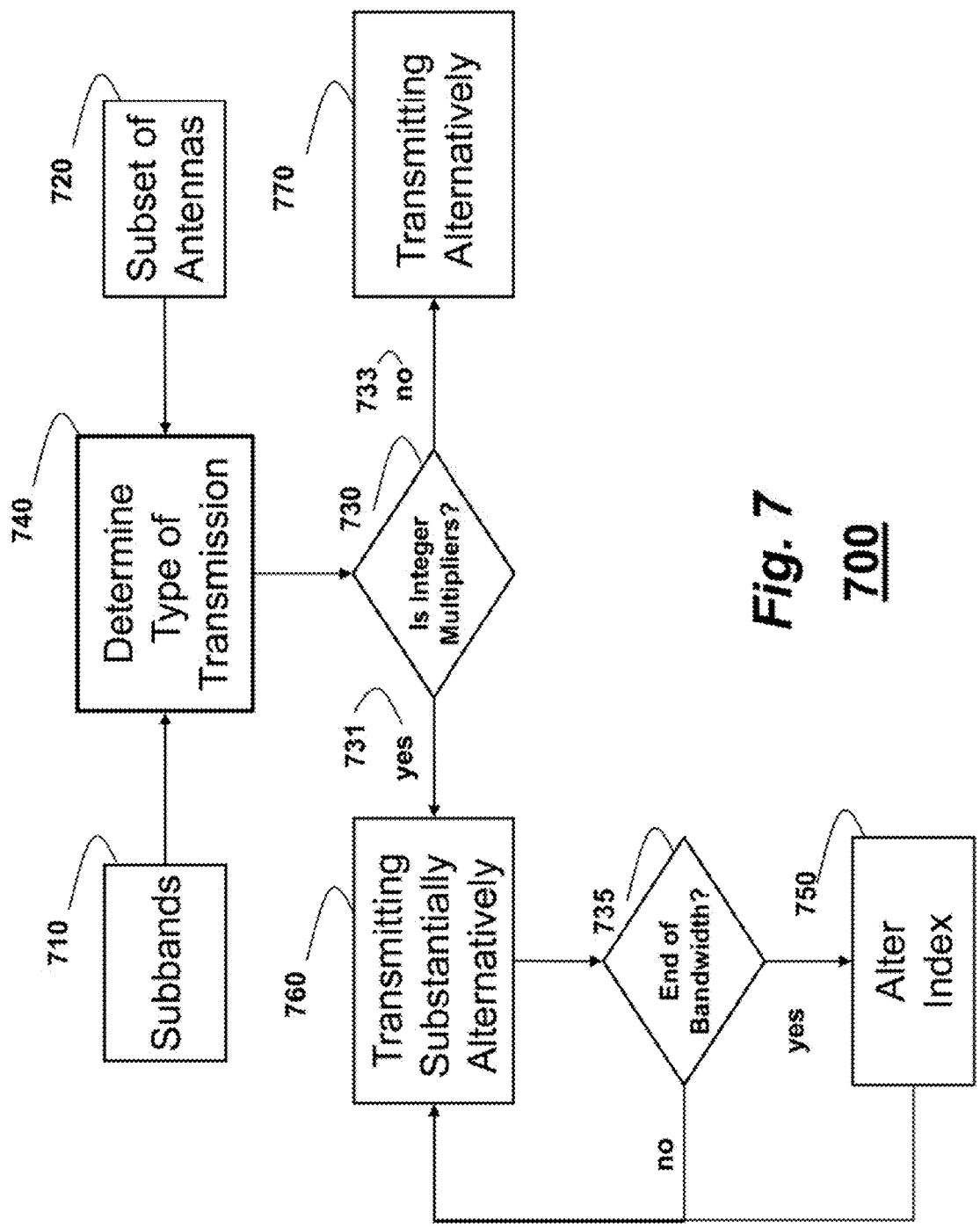
FIG. 7 is a block diagram of a method and a network for training subsets of antennas with, the frequency-hopped SRS according to embodiments of the invention.

FIG. 7 shows a method and a network 700 for training for the subset of antennas with the frequency-hopped SRS transmitted from the subsets of antennas according to embodiments of the invention. Transmitting substantially alternately means, as define herein for the purpose of this specification and appended claims, that the SRSs are transmitted from each subset in the set of antennas alternately, but periodically an order of the subsets schedule for the transmission is altered.

In some embodiments, we assign an index for each subset of antennas. We also use the 'selected' and 'unselected' subset of antennas as an indication to select particular subset of the antennas by the transceiver for the transmission.

For example, if the transceiver has two subsets of antennas, the indexes will be 0 and 1. Accordingly, the transmitting alternately leads to an index pattern of the selected subset of antennas [0, 1, 0, 1, 0, 1, 0, 1 . . . ]. If the transceiver use more than two subsets of antennas for the transmission, all the subsets of antennas transmit the SRS signals alternately according indexes of the subset. For example, if the transceiver has three subsets of antennas, the index pattern of the selected subset of antennas [0, 1, 2, 0, 1, 2, 0, 1, 2, 0, 1, 2 . . . ]. Thus, we are switching the index of the selected subset of antennas every time after the transmitting the frequency-hopped SRS.

However, the transmitting substantially alternately leads to an index pattern, e.g., [0, 1, 0, 1, 1, 0, 1, 0, 0, 1 . . . ]. Please note, that for the transmitting substantially alternately method we periodically alter the index for die transmitting subset, e.g., shift or omit the indexes. The index of the selected subset of antennas $a(n_{SRS})$ depends on the subframe number $n_{SRS}$ in which the SRS is transmitted and a number of the subset of antennas. Therefore, the index pattern above can be specified, in the form a functional relationship between $a(n_{SRS})$ and $n_{SRS}$, The functional relationship depends on other parameters such as, but not limited to, the base station index and the length of the SRS sequence.

We determine 740 a type of a transmission based on a relationship between the number of subbands 710 in the bandwidth and the number of the subsets of transmit antennas 720 to be trained. As described in details below, if 730 the number of subbands is an integer multiplier of the number of transmit antennas 731, we transmit the SRSs substantially alternately 760. For example, we switch an antenna index 750 every time when the end of bandwidth is reached 735. In alternative embodiment, we switch antenna index after the end or at the beginning of the frequency-hopped pattern, if 730 the number of subbands is not integer multiplier of the number of transmit antennas 733, we transmit the SRSs alternately.

Figure 8:
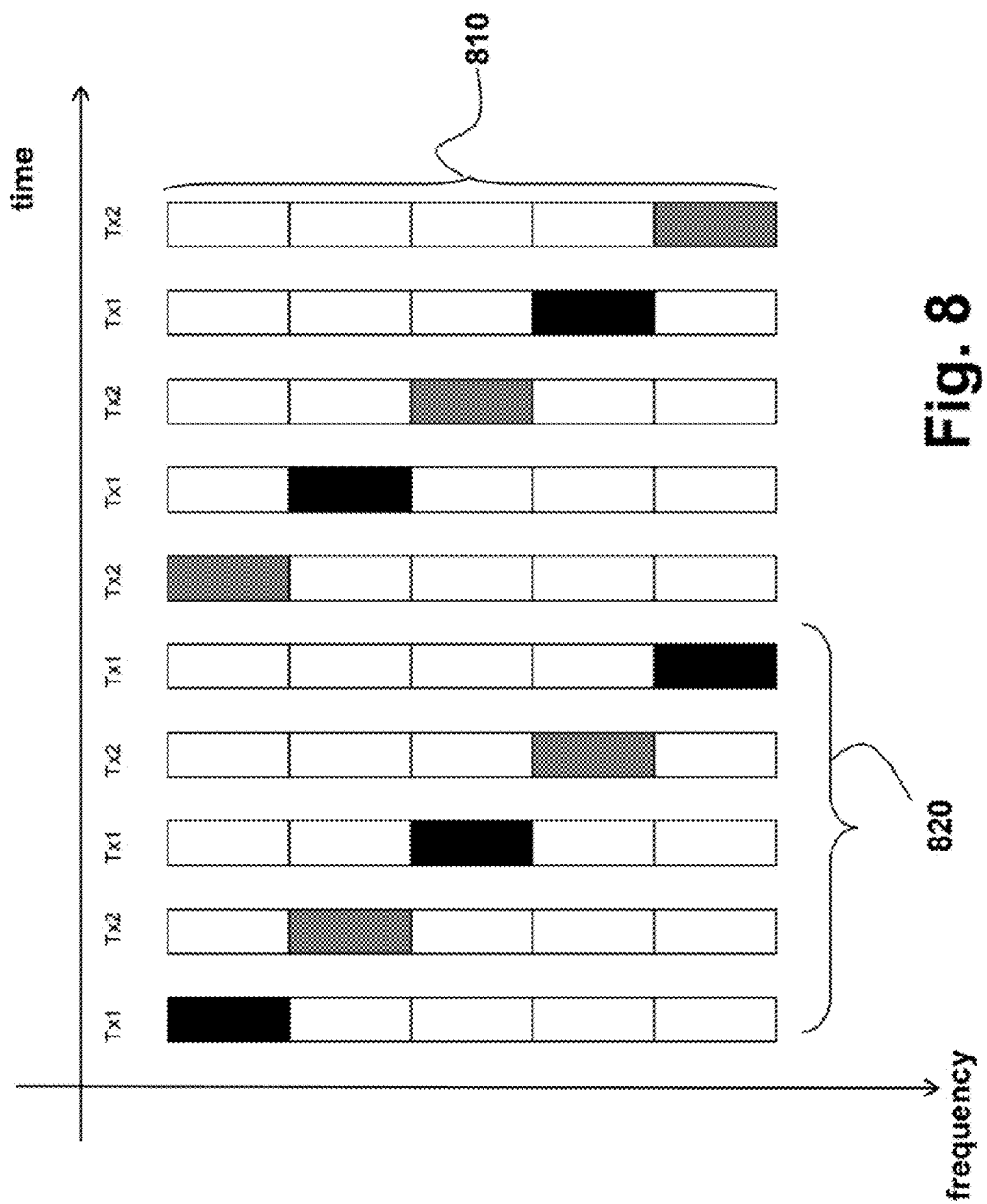
FIGS. 8 and 9 are block diagrams of a frequency-hopped sound reference signal (SRS) transmission according to embodiments of the invention.

FIG. 8 shows a diagram for a method for transmitting alternately the frequency-hopped SRS. The available bandwidth of B Hz 810 is split into $N_f$ 830 subbands of bandwidth $$\frac{B}{N_f}$$

Hz each. If number of subbands is odd, e.g., $N_f$=5, and the number of the subsets of antennas is even, e.g., two, then the number of subbands is not integer multiplier of the number of transmit antennas. Thus, the transmission from the two antennas, Tx1 and Tx2, alternately results in a time-interleaved frequency hopping pattern.

Figure 9:
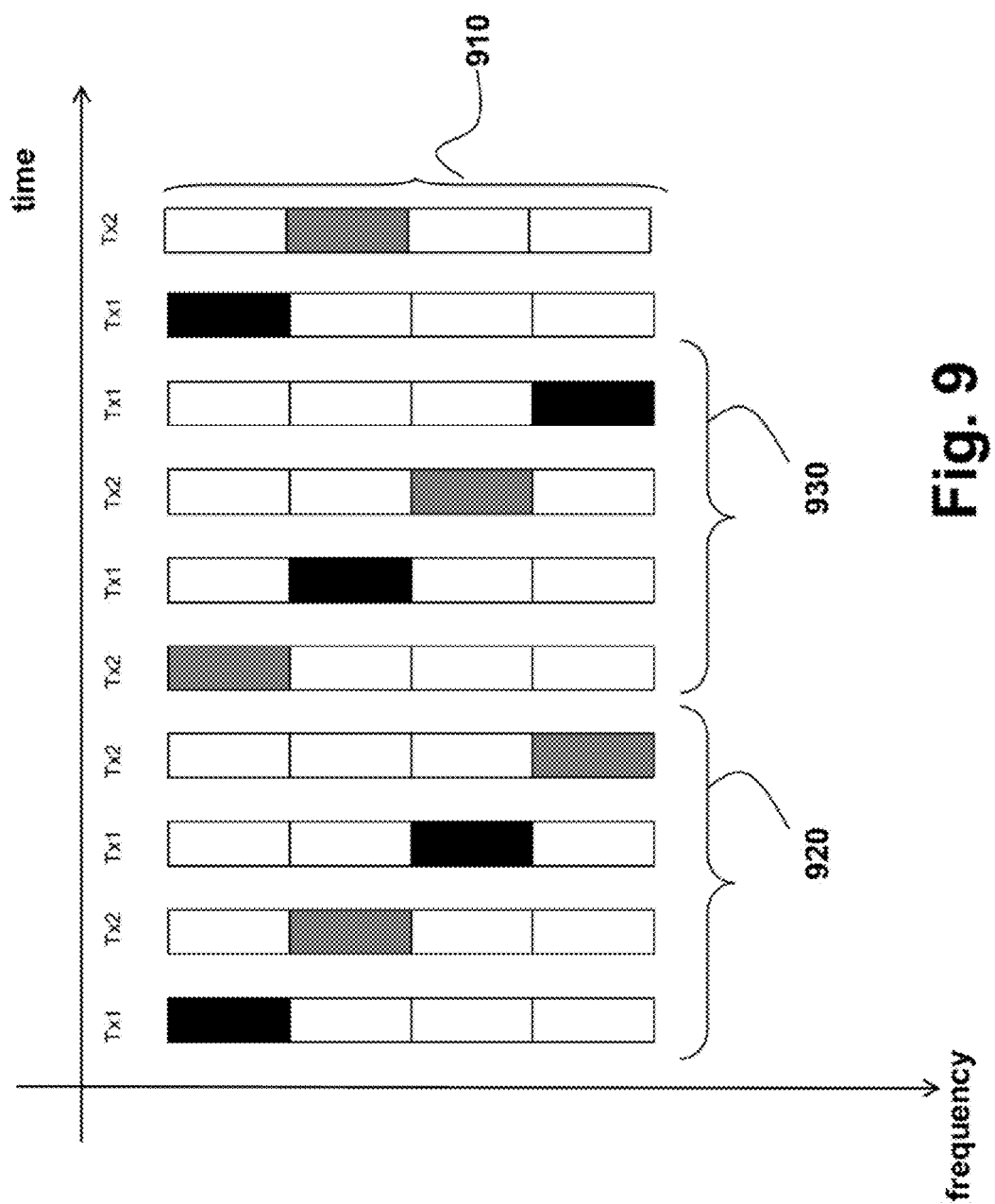

FIG. 9 shows a diagram for a method for transmitting substantially alternately the frequency-hopped SRS. In this embodiment, the number of subbands, i.e., tour, is integer multiplier of the number of transmitting antennas, i.e., two. Accordingly, when the transmission reaches the end of the bandwidth, e.g., a pattern of transmissions 920, we switch the indexes of the subset of the antennas. Thus, the next pattern of transmissions 930 starts from the subset of antennas Tx2, instead of the subset Tx1 as for the cycle 920.

As described above, in one embodiment, the decision of which training pattern to use is made by the base station. The training pattern is transmitted to the transceiver as part of the instruction 151. In alternative embodiment, the transceiver has knowledge about the possible training patterns, and the instruction 151 includes only identification of the training pattern to use.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for antenna selection (AS) in a transceiver having a number of subsets of antennas for transmitting a frequency-hopped sounding reference signal (SRS) over a sub-band of a bandwidth from a subset of antennas at a time, comprising:
   determining whether a number of sub-bands in the bandwidth is an integer multiplier of the number of subsets of antennas; and
   transmitting the SRS alternately from the subsets of the antennas if the number of sub-bands is not the integer multiplier of the subsets of antennas, and transmitting the SRS substantially alternatively, if the number of sub-bands is the integer multiplier of the subsets of antennas, wherein the transmitting substantially alternatively includes transmitting the SRS alternatively and periodically switching an order of transmission to continuously transmit two SRSs from the same subset of antennas.

* * * * *